United States Patent [19]
Dobbins

[11] 3,907,009
[45] Sept. 23, 1975

[54] HYPODERMIC LOAD CALIBRATOR
[76] Inventor: Charles Dobbins, 65-24 162nd St., Flushing, N.Y. 11365
[22] Filed: Oct. 15, 1974
[21] Appl. No.: 514,677

[52] U.S. Cl................. 141/27; 141/95; 128/218 C; 141/378
[51] Int. Cl.² ............................................ B65B 3/32
[58] Field of Search .............................. 141/13–28, 141/369–386, 392, 1, 2, 94, 95; 222/309, 43, 23–26, 29, 46, 47; 73/425.6; 128/218 C; 33/168 R, 194

[56] References Cited
UNITED STATES PATENTS
| | | | |
|---|---|---|---|
| 3,492,876 | 2/1970 | Buw et al.............................. | 141/27 |
| 3,602,272 | 8/1971 | Stawski................................ | 141/27 |
| 3,844,318 | 10/1974 | Raia et al............................. | 141/27 |

Primary Examiner—Houston S. Bell, Jr.
Attorney, Agent, or Firm—Leonard H. King

[57] ABSTRACT

An apparatus for regulating loading of a hypodermic syringe with a predetermined dosage comprising means for determining the distance between a hypodermic lateral support and the head of the piston and means to preset the relationship in accordance with the desired dosage to be administered.

4 Claims, 5 Drawing Figures

HYPODERMIC LOAD CALIBRATOR

The aforementioned Abstract is neither intended to define the invention of the application which, of course, is measured by the claims, nor is it intended to be limiting as to the scope of the invention in any way.

FIELD OF THE INVENTION

This invention relates to hypodermic syringes and more particularly means for automatically determining the loading of the syringe.

BACKGROUND OF THE INVENTION

Diabetic patients and others on a regular regiment of injections frequently self administer the injection or have it done by a member of the household. The hypodermic barrel is calibrated in closely spaced markings representing doses. The American Diabetes Association has approved a special marking style for the "official insulin syringes" authorized for use by diabetics. In accordance with these standards one scale used is marked in red for a "U-40" and in green for a "U-80" concentration (40 and 80 units per cc respectively). The divisions are closely spaced and it is difficult for one with physical disability or impaired eyesight to properly load the syringe with the proper dose. In the case of persons suffering from advanced cases of diabetes such symptoms of impairment are common. Accordingly, a means is required to enable one to load the hypodermic with the proper dosage without the necessity of observing the scale on the hypodermic barrel.

Accordingly, it is an object of this invention to provide an apparatus for loading a hypodermic with a predetermined quantity of fluid.

There is a further object of this invention to provide an improved apparatus for loading a hypodermic with a predetermined quantity of fluid which limits the amount of fluid the hypodermic will withdraw from a vial.

A further object of this invention is to provide an adjustable means for predetermining the loading of a hypodermic.

SUMMARY OF THE INVENTION

A stand is provided having means for receiving a hypodermic. An adjustable gauging means is incorporated for regulating the extent to which the piston of the hypodermic may be withdrawn from the barrel.

Still other objects and advantages of the present invention will become obvious or will in part be pointed out with particularity as the following description proceeds taken in conjunction with the accompanying drawing.

DESCRIPTION OF THE EMBODIMENT

Figure 3:
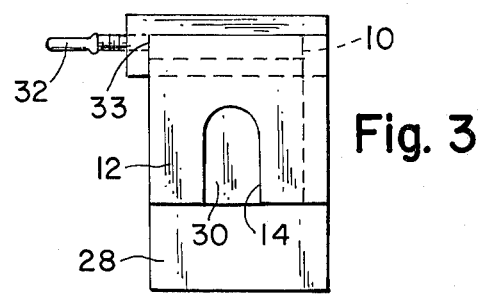
FIG. 3 is a top plan view of the device shown in FIG. 1.
Figure 1:
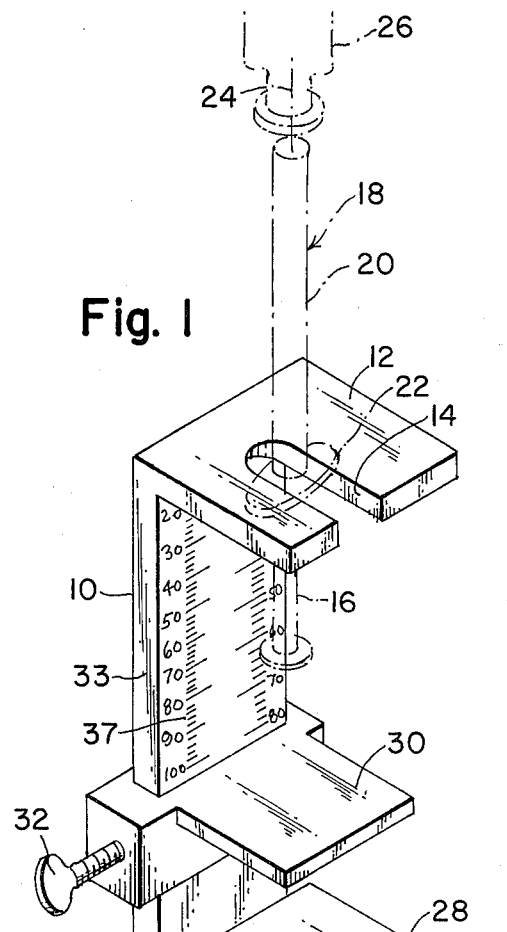
FIG. 1 is a perspective view showing the device of this invention with a conventional hypodermic and vial shown in phantom.
Figure 2:
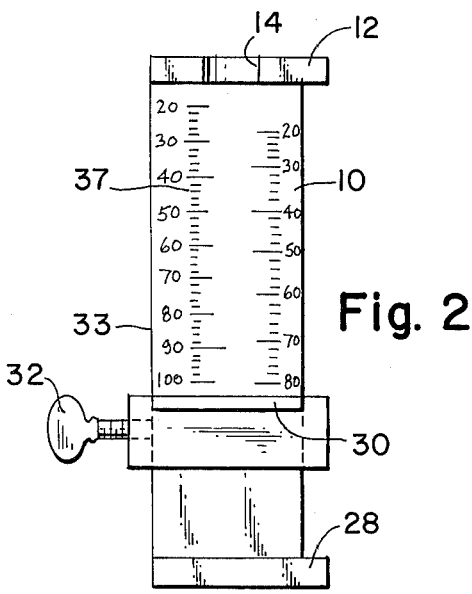
FIG. 2 is a front elevational view of the device illustrated in FIG. 1.

The basic form of the invention illustrated in the drawings, particularly in FIG. 1, comprises a main suppport or guide 10 which is shown as a flat member of the rectangular cross section. The support may take any conventional form such as a rod or hollow tube. Extending from the upper end of support 10, there is an upper platform 12 provided with a slot 14 to receive the plunger 16 of a conventional hypodermic 18. The barrel 20 of the hypodermic is provided with conventional lateral extending projections 22. Upon inserting the hypodermic in the holder, the projections rest on the platform 12. The needle 24 is shown inserted in the conventional drug vial 26. The member 10 is supported by a stand 28. Slideably mounted on the support 10 there is a moveable platform 30 which may be locked at a selected point along support member 10 by means of a thumb screw. Thumb screw 32 locks against edge 33 of member 10. The proper position along the platform is readily determined by reference to scale 37. Alternatively, the piston of the hypodermic may be withdrawn to the desired dosage and then used as a gauge to set the platform.

Once the apparatus is preset, the user then takes the hypodermic, inserts the needle 24 into vial 26 and withdraws an amount in excess of the desired dosage. With the vial still located in engagement with the needle 24, the hypodermic is inserted into the gauging device by slipping the plunger into slot 14. By pushing the head of the plunger against the platform until the laterally extending plate 22 seats at the top of the upper platform 12, the excess liquid will be forced back into the vial. As a result, the desired dosage remains in the hypodermic for injection into the patient.

The device may be operated in a slightly different fashion by inserting the needle into the vial 26 without withdrawing the plunger, locating the hypodermic on the apparatus with the lateral guide seated on the top platform and then withdrawing the plunger until it meets the adjustable gauge platform 30 at which time the proper dosage will have been withdrawn from the vial into the hypodermic.

Figure 5:
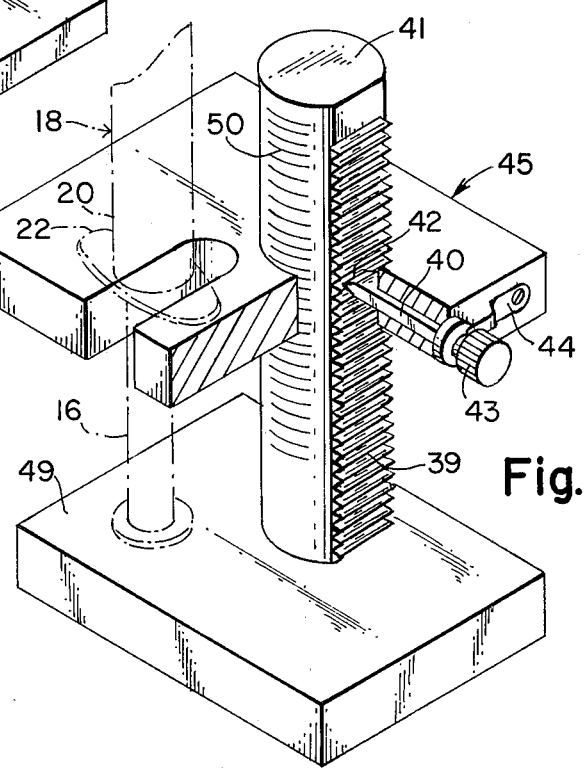
FIG. 5 is a perspective view of a portion of the apparatus shown in FIG. 1 with the alternative locking means for the adjustable gauge. The gauge being shown partially broken away to show the locking means.
Figure 4:
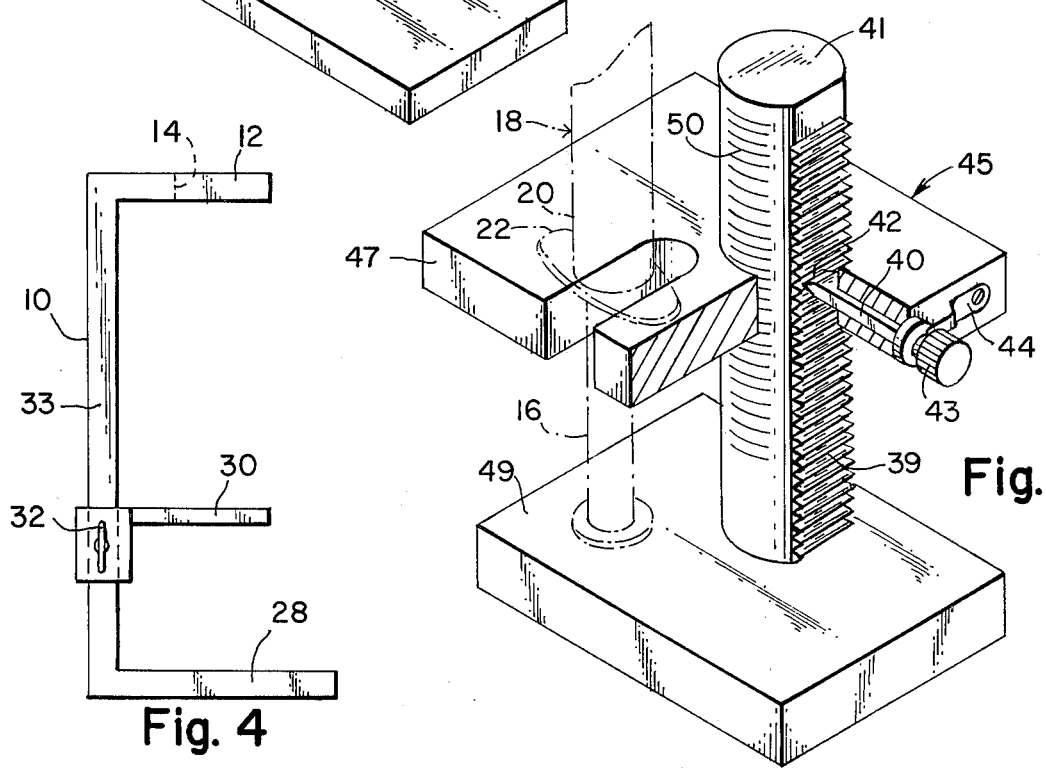
FIG. 4 is a side elevational view of the device shown in FIG. 1.

In FIG. 5 there is shown a modified form of the gauge wherein post 41 is provided with a series of serrations 39. The adjustable gauge platform 45 is provided with a detent pin 40 having a pointed tip 42 adapted to engage the serrations 39. The other end of the pin 40 is provided with a knob permitting the user to grasp same and withdraw the pointed end 42 from the serration against the action of leaf spring 44. The leaf spring 44 biases the pin in a direction so as to engage the serrations.

The user knowing the dosage desired, moves the adjustable platform along the support post 41 so that it is aligned with the scale 50 of the gauge corresponding to the desired dosage. The gauge platform is then locked in position by either the thumb screw 32 or by the self-locking device shown in FIG. 5. It will be appreciated that still other conventional locking means may be employed.

It should be noted that in the embodiment of FIG. 5, the hypodermic rests on the moveable platform member 47 and the head of the piston seats on the stand member 49. This embodiment eliminates one transverse member.

There has been disclosed heretofore the best embodiment of the invention presently contemplated. However, it is to be understood that various changes and modifications may be made thereto without departing from the spirit of the invention.

What I claim as new and desire to secure by Letters Patent is:

1. An apparatus for loading a hypodermic syringe of the type having an integral needle with a predetermined dosage of a fluid that is in a container having rupturable closure wall which is adapted to be pierced by the hypodermic needle to thereby provide direct fluid communication between the interior of the container and the interior of the hypodermic syringe, said apparatus comprising:
   a. a post having indicating means thereon corresponding to the predetermined dosage;
   b. a first, non-adjustable member rigidly secured to said post and adapted to engage a portion of the hypodermic syringe;
   c. a second, movable member adjustably carried by said post; said second member having means to receive another portion of the hypodermic syringe that is relatively movable with respect to the first portion of the hypodermic syringe; and
   d. means to lock said movable member in a fixed position relative to said indicating means on said post.

2. The apparatus of claim 1 wherein said locking means is a screw.

3. The apparatus of claim 1 wherein said locking means is a movable pin.

4. The apparatus of claim 1 wherein said post is rectangular in cross-section.

* * * * *